United States Patent Office 2,965,666
Patented Dec. 20, 1960

2,965,666

METHOD OF PRODUCING N-SUBSTITUTED DERIVATIVES OF IMIDODI-PHOSPHORIC AND -THIOPHOSPHORIC ACIDS

Arno Debo, Heidelberg, Germany, assignor to Firma Joh. A. Benckiser G.m.b.H. Chemische Fabrik, Ludwigshafen (Rhine), Germany No Drawing. Filed July 7, 1958, Ser. No. 746,595

Claims priority, application Germany July 5, 1957

6 Claims. (Cl. 260—461)

The present invention relates to a new method of producing N-substituted derivatives of imidodi-phosphoric and -thiophosphoric acids, and more particularly to a method which results in the production of these derivatives more rapidly, in higher yield and at less expense than was hitherto possible.

Most particularly, the present invention relates to a method of producing imidodiphosphoric acid derivatives of the following general formula:

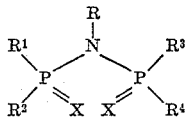

wherein $R^1$, $R^2$, $R^3$ and $R^4$ are each alkoxy groups of preferably 1–8 carbon atoms and most preferably 1–4 carbon atoms, or an aryloxy group such as phenoxy, benzoxy, methylphenoxy, dimethylphenoxy and trimethylphenoxy, or a dialkylamido group wherein each alkyl group contains 1–5 carbon atoms, or another amido group such as morpholino, piperidino, dicyclohexylamino, methylaniline, ethylaniline and ethyleneimine; wherein R is an alkyl radical of preferably 1–8 carbon atoms and most preferably 1–4 carbon atoms, or an aryl group such as phenyl, methylphenyl, dimethylphenyl, and trimethylphenyl radicals; and wherein X is oxygen or sulfur.

Among the alkoxy groups for the substituents $R^1$, $R^2$, $R^3$ and $R^4$ may be mentioned methoxy, ethoxy, propoxy, isopropoxy, butoxy, isobutoxy, amyloxy and iso-octoxy. Among the dialkylamido groups may be mentioned dimethylamine, diethylamine, dibutylamine and diamylamine. Among the alkyl radicals for the substituent R may be mentioned methyl, ethyl, propyl, isopropyl, butyl, isobutyl, iso-octyl, and cyclohexyl.

It is a primary object of the present invention to provide a simple method of producing the above imidodiphosphoric acid derivatives in a single step, rapidly, and in very high yield.

It is still another object of the present invention to provide a method of producing the above imidodiphosphoric acid derivatives in quantitative yield in practically pure state in a single step wherein the reaction proceeds in a very short period of time.

Other objects and advantages of the present invention will be apparent from a further reading of the specification and of the appended claims.

With the above objects in view, the present invention mainly consists in a method of producing imidodiphosphoric acid derivatives of the following general formula:

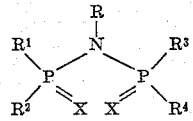

wherein $R^1$, $R^2$, $R^3$ and $R^4$ are each selected from the group consisting of alkoxy groups of 1–8 carbon atoms, phenoxy, benzoxy, methylphenoxy, dimethylphenoxy, trimethylphenoxy, dialkylamido groups wherein each alkyl group contains 1–5 carbon atoms, morpholino, piperidino, dicyclohexylamino, methylaniline, ethylaniline and ethyleneimine groups, wherein R is selected from the group consisting of alkyl radicals of 1–8 carbon atoms, phenyl, methylphenyl, dimethylphenyl, and trimethylphenyl radicals, and wherein X is selected from the group consisting of oxygen and sulfur, which comprises reacting a halogen-phosphoric acid derivative having the following general formula:

$$\text{Hal-P}(X)R^1R^2$$

wherein $R^1$, $R^2$ and X have the same definitions as above and wherein Hal is a halogen, with an amidophosphate having the following general formula:

$$R^3R^4P(X)NRH$$

wherein $R^3$, $R^4$, X and R have the same definitions as above, in an inert solvent in the presence of a substance selected from the group consisting of sodium, sodium hydride, potassium, potassium hydride, lithium and calcium.

The halogen is preferably chlorine. Bromo-phosphoric acid derivatives are somewhat less economic and practical.

The following is a list of among the suitable halogen-phosphoric acid derivatives that may be reacted in accordance with the present invention:

Chlorophosphoric acid-dimethyl ester
Chlorophosphoric acid-diethyl ester
Chlorophosphoric acid-dipropyl ester
Chlorophosphoric acid-diisopropyl ester
Chlorophosphoric acid-dibutyl ester
Chlorophosphoric acid-diisobutyl ester
Chlorophosphoric acid-diisoamyl ester
Chlorophosphoric acid-diisooctyl ester
Chlorophosphoric acid-diphenyl ester,
Chlorophosphoric acid-dibenzyl ester
Chlorophosphoric acid-dicresyl ester As indicated above, the corresponding bromine derivatives may be used instead of the chlorine derivatives, although the chlorine derivatives are more economical and practical.

Among the suitable amidophosphates which may be reacted according to the present invention are reaction products of the above chlorophosphoric acid-diesters with amines such as monomethylamine, monethylamine, propylamine, butylamine, amylamine, cyclohexylamine, aniline, toluidine, etc.

The reaction in accordance with the present invention is carried out in an inert organic solvent, that is a solvent that does not react with any of the reactants. Among the suitable solvents may be mentioned benzene, xylene, toluene, ether, petroleum ether, hydrocarbons, cyclohexane, methylcyclohexane, standard gasoline, and the like. Organic solvents such as chlorinated hydrocarbons which react with one or more of the reactants should not be used. The solvent should be inert to the reaction.

The reaction of the present invention takes place in the presence of a substance such as sodium, sodium hydride, potassium, potassium hydride, lithium or calcium which acts as a halogen acceptor and permits the reaction to take place rapidly and to go to completion. For reasons of economy and ready availability, sodium and sodium hydride are most preferred.

The reaction of the present invention proceeds in accordance with the following equations:

(I) 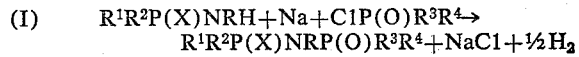

or (II) 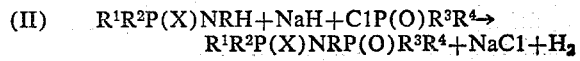

The reaction, which is exothermic, is preferably carried out at room temperature though any temperature between 0° C. and the boiling point of the solvent may be utilized. The temperature should also be below the melting point of sodium, assuming that sodium is utilized in the reaction. In general the reaction may be carried out at a temperature of 0–150° C. and preferably of 20–90° C.

The above reaction may be carried out by dissolving the halogen-phosphoric acid derivative and the amido phosphate in an inert solvent and adding the sodium hydride or sodium suspension thereto while stirring. The reaction may also be carried out by adding the halogen-phosphoric acid derivative dropwise to a mixture of the amido phosphate and for example sodium hydride.

The sodium or sodium hydride utilized in the reaction is preferably utilized in the form of a suspension of the same in an inert liquid hydrocarbon, i.e. one which does not react with the sodium or sodium hydride. Chlorinated hydrocarbons are for example not suitable because the same will react with sodium. The inert liquid hydrocarbon should also have a boiling point above the melting point of the sodium, i.e. 97.5° C. Among the suitable inert liquid hydrocarbon for this purpose may be mentioned technical grade oil, standard gasoline, xylene, toluene, spindel oil and Bayol.

Since the raction is practically quantitative with equimolecular amounts of the reactants, i.e. the halogen-phosphoric acid, the amido phosphate and the sodium, it is preferred to utilize equimolecular amounts of these reactants. Of course the reaction will proceed if other than equimolecular amounts are utilized, though other amounts will reduce the yield from the quantitative standpoint. Accordingly stoichiometric amounts should be used.

It is most suitable to carry out the above reaction to completion by bringing the reaction mass to a boil for a short time or by stirring the reaction mass for a short time after the reactants are all mixed together. The great advantage of the method of the present invention is that the entire reaction, including the mixing of the reactants with each other takes only a very short time to go to completion. Thus, the complete reaction according to the present invention requires as little as one hour or less whereas prior methods requires 12 to 16 hours.

After completion of the reaction the sodium chloride is easily separated, for example by filtration, to obtain the imidodiphosphoric acid derivative substituted at the nitrogen bridge.

In carrying out the reaction in the inert solvent the reactant should preferably comprise about 5–50% of the solvent, and most preferably about 20% by weight.

The following are among the compounds that may be produced by the process of the invention:

Methylimido-diphosphoric acid-tetraethyl ester
Methylimido-phosphoric acid-tetraethyl ester
Methylimido-diphosphoric acid-tetrapropyl ester
Methylimido-diphosphoric acid-tetrabutyl ester
Methylimido - diphosphoric acid - dimethyl - ester - bis-dimethylamide
Methylimido-diphosphoric acid-diethyl-ester-bis-dimethylamide
Methylimido - diphosphoric acid - dipropyl - ester - bis-dimethylamide
Methylimido - diphosphoric acid - dibutyl - ester - bis-dimethylamide and of course the corresponding derivative of ethylimido-diphosphoric acid. Other compounds include:

Cyclohexylimido-diphosphoric acid-tetramethyl ester
Cyclohexylimido-diphosphoric acid-tetraethyl ester
Cyclohexylimido-diphosphoric acid-tetraphenyl ester
Anilido-diphosphoric acid-tetraethyl ester
Anilido-diphosphoric acid-tetraphenyl ester
Anilido-diphosphoric acid-diphenyl-ester-bis-diethylamide
Anilido-diphosphoric acid-diphenyl-ester-dimorpholide
Methylamine-N-phosphoric acid-diethyl-ester-N-thiophosphoric acid-diethyl ester
Ethylamine-N-phosphoric acid-bis-diethylamide-N-thiophosphoric acid-diethyl ester The products produced according to the present invention have an excellent insecticidal action and are relatively non-toxic for warm blooded animals. In addition, these compounds may be utilized as additives for lubricating oil, the compounds having the property of maintaining the viscosity of the oil at a constant value over a relatively large temperature range.

The following examples are given to further illustrate the present invention. The scope of the invention is not, however, meant to be limited to the specific details of the examples.

EXAMPLE 1

*The production of anilido-diphosphoric acid-tetra-n-propylester (anilin-N,N-bis-phosphoric acid-di-n-propyl ester)* $(nC_3H_7O)_2P(O)N(C_6H_5)P(O)(OC_3H_7-n)_2$ 25.7 g. of phosphoric acid-di-n-propyl ester-anilide and 20 g. of monochlorophosphoric acid-di-n-propyl ester are dissolved in 100 cc. of dry ethyl ether. 2.4 g. of sodium hydride are added in portions under stirring. After the completion of the gas evolvement the reaction mixture is stirred for an aditional 10 minutes. The entire reaction requires a total of less than one hour.

The separated sodium chloride is filtered off and the ether is evaporated under vacuum. The residue is shaken up with water. If the water-insoluble oil is not colorless, it is dissolved in methanol and shaken with activated carbon. After filtering the activated carbon and distilling off the methanol, 40 g. of a practically colorless oil is obtained. The yield amounts to 95% of the theoretical. $n_D^{20} = 1.4775$.

*Analysis.*—P calculated—14.73%; found—14.8%. N calculated—3.33%; found—3.26%.

The above example can be carried out utilizing 4.0 g. of potassium hydride instead of the 2.4 g. of sodium hydride.

EXAMPLE 2

*The production of phenylimido-diphosphoric acid-tetrapropyl ester*

$(n-C_3H_7O)_2P(O)N(C_6H_5)P(O)(OC_3H_7-n)_2$ 25.7 g. of phosphoric acid-dipropyl ester-anilide and 20 g. of monochlorophosphoric acid-dipropyl ester are dissolved in 150 cc. of dry xylene. 6.9 g. of a 33% dispersion of sodium in xylene is added dropwise under stirring. After the end of the gas development the reaction mixture is stirred an additional 15 minutes. The total reaction time requires less than one hour.

The formed sodium chloride is separated by filtration and the xylene is distilled off under vacuum. The residue is shaken with water to remove any still remaining salt. 41 g. of the desired compound are thus obtained. The yield corresponds to 97.3% of the theoretical. $n_D^{20} = 1.4770$. The calculated molecular weight is 421. The molecular weight found for the compound is 453 (cryoscopic method in nitrobenzene).

EXAMPLE 3

*The production of ethylimidodiphosphoric acid-tetraethyl ester (ethylamine-N,N-bis-phosphoric acid-diethyl ester)* $(C_2H_5O)_2P(O)N(C_2H_5)P(O)(OC_2H_5)_2$ 36.2 g. of phosphoric acid-diethyl ester-monoethylamide and 34.5 g. of monochlorophosphoric acid-diethyl ester are dissolved in 100 cc. of dry toluene. 4.8 g. of sodium hydride as a 20% suspension in oil are added dropwise under stirring. A vigorous development of gas occurs and the reaction mixture heats itself to 50° C.

The stirring is continued for an additional 10 minutes and the toluene is subsequently drawn off under vacuum. The residue is taken up in ethanol and the precipitated sodium chloride is separated. The desired compound upon distillation goes over at a temperature of 125 to 150° C. at 2 mm. Hg of pressure. $n_D^{20}=1.4338$.

*Analysis.*—P calculated — 19.6%; found — 19.8%, 19.9%. N calculated—4.45%; found—4.3%.

EXAMPLE 4

*The production of methylimidodiphosphoric acid-tetraphenyl ester (methylamine-N,N-bis-phosphoric acid-diphenyl ester)*

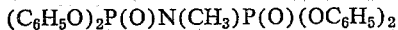
$(C_6H_5O)_2P(O)N(CH_3)P(O)(OC_6H_5)_2$ 1.3 g. of sodium hydride and 14 g. of phosphoric acid-diphenyl ester-monomethylamide are suspended in 100 cc. of benzene. While heating and stirring 14.3 g. of monochlorophosphoric acid-diphenyl ester are added dropwise. After the completion of the addition, requiring about 30 minutes, the precipitated sodium chloride is filtered off and the benzene is distilled off. 23 g. of the desired compound are thus obtained as a practically colorless oil; the yield corresponds to 87.2% of the theoretical. The compound is easily soluble in alcohol and is insoluble in water.

*Analysis.*—P calculated—12.53%; found—12.1%, 12.4%. N calculated—2.81%; found—2.6%, 2.7%.

This example could be carried out utilizing 2.2 g. of potassium hydride instead of the sodium hydride.

EXAMPLE 5

*The production of methylimidodiphosphoric acid-tetrakis-dimethylamide (nonamethyl - imidodiphosphoric acid-tetramide)*

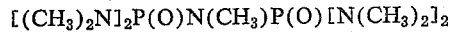
$[(CH_3)_2N]_2P(O)N(CH_3)P(O)[N(CH_3)_2]_2$ 28 g. of pentamethyl-phosphoric acid-triamide and 29 g. of monochlorophosphoric acid-bis-dimethylamide are dissolved in 100 cc. of dry xylene. 4.1 g. of sodium hydride in the form of a 20% suspension in oil are added under stirring. Gas development occurs at 30° C. At the end of the gas development the reaction mixture is heated for a short time to boiling. The entire reaction time requires less than 1 hour. The precipitated sodium chloride is filtered off and the filtrate is distilled off under vacuum. The desired compound is obtained upon fractional distillation as the fraction coming off at 2 mm. Hg at a temperature of 160–170° C.

The syrup crystallizes after inoculation or stirring with a glass rod, the crystallization occurring suddenly. The compound is extremely hygroscopic. M.P.=58° C.

*Analysis.*—P calculated—20.75%; found—20.4%. N calculated—23.45%; found—22.2%.

This example could be carried out utilizing 6.7 g. of potassium or 22.6 g. of lithium instead of the sodium hydride.

EXAMPLE 6

*The production of aniline-N-thiophosphoric acid-diethyl ester-N-phosphoric acid-diethyl ester*

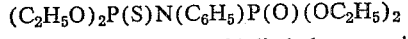
$(C_2H_5O)_2P(S)N(C_6H_5)P(O)(OC_2H_5)_2$ 24.5 g. of thiophosphoric acid-diethyl ester-anilide and 17.3 g. of chlorophosphoric acid-diethyl ester are added to 160 cc. of benzene. 12 g. of a 20% sodium hydride suspension in xylene are added under stirring and exclusion of moisture. The addition is made dropwise. The reaction is completed within 15 minutes. In order to separate the side product, namely the produced sodium chloride, the reaction mixture is cooked an additional 3 hours under stirring and refluxing and the mixture is allowed to stand overnight. The precipitated sodium chloride is then filtered off. The solvent is drawn off and the desired compound remains as a yellow oil. The yield is 32 g. which corresponds to 84% of the theoretical. $n_D^{20}=1.5025$. The calculated molecular weight is 381. The molecular weight found by cryoscopic determination in nitrobenzene is 370.

*Analysis.*—P calculated—16.27%, found—16.4%. S calculated—8.4%, found—8.5%.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of producing imidodiphosphoric acid derivatives of the following general formula:

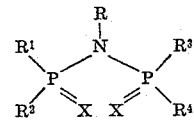

wherein $R^1$, $R^2$, $R^3$ and $R^4$ are each selected from the group consisting of ethoxy, propyloxy, phenoxy and dimethylamino, wherein R is selected from the group consisting of methyl, ethyl and phenyl, and wherein X is selected from the group consisting of oxygen and sulfur, which comprises reacting a halogen-phosphoric acid derivative having the following general formula:

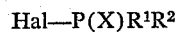
$Hal—P(X)R^1R^2$ wherein $R^1$, $R^2$ and X have the same definitions as above and wherein Hal is chlorine, with an amidophosphate having the following general formula:

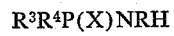
$R^3R^4P(X)NRH$ wherein $R^3$, $R^4$, X and R have the same definitions as above, in an inert solvent having dispersed therein a substance selected from the group consisting of sodium, sodium hydride, potassium, potassium hydride, lithium and calcium.

2. A method of producing imidodiphosphoric acid derivatives of the following general formula:

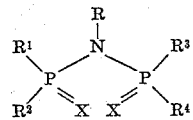

wherein $R^1$, $R^2$, $R^3$ and $R^4$ are each selected from the group consisting of ethoxy, propyloxy, phenoxy and dimethylamino, wherein R is selected from the group consisting of methyl, ethyl and phenyl, and wherein X is selected from the group consisting of oxygen and sulfur, which comprises reacting a halogen-phosphoric acid derivative having the following general formula:

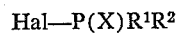
$Hal—P(X)R^1R^2$ wherein $R^1$, $R^2$ and X have the same definitions as above and wherein Hal is chlorine, with an amidophosphate having the following general formula:

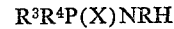
$R^3R^4P(X)NRH$ wherein $R^3$, $R^4$, X and R have the same definitions as above, in an inert solvent in the presence of a suspension of sodium.

3. A method of producing imidodiphosphoric acid derivatives of the following general formula:

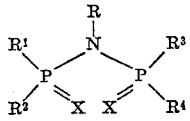

wherein $R^1$, $R^2$, $R^3$ and $R^4$ are each selected from the group consisting of ethoxy, propyloxy, phenoxy and dimethylamino, wherein R is selected from the group consisting of methyl, ethyl and phenyl, and wherein X is selected from the group consisting of oxygen and sulfur, which comprises reacting a halogen-phosphoric acid derivative having the following general formula:

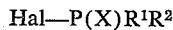

wherein $R^1$, $R^2$ and X have the same definitions as above and wherein Hal is chlorine, with an amidophosphate having the following general formula:

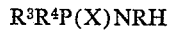

wherein $R^3$, $R^4$, X and R have the same definitions as above, in an inert solvent in the presence of an oil suspension of sodium hydride.

4. A method of producing imidodiphosphoric acid derivatives of the following general formula:

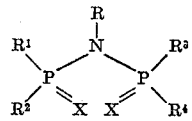

wherein $R^1$, $R^2$, $R^3$ and $R^4$ are each selected from the group consisting of ethoxy, propyloxy, phenoxy and dimethylamino, wherein R is selected from the group consisting of methyl, ethyl and phenyl, and wherein X is selected from the group consisting of oxygen and sulfur, which comprises reacting a halogen-phosphoric acid derivative having the following general formula:

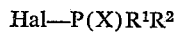

wherein $R^1$, $R^2$ and X have the same definitions as above and wherein Hal is chlorine, with an amidophosphate having the following general formula:

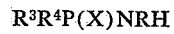

wherein $R^3$, $R^4$, X and R have the same definitions as above, in an inert solvent having dispersed therein a substance selected from the group consisting of sodium, sodium hydride, potassium, potassium hydride, lithium and calcium, said halogen-phosphoric acid derivative, said amidophosphate and said substance being in substantial equimolecular quantities.

5. A method of producing imidodiphosphoric acid derivatives of the following general formula:

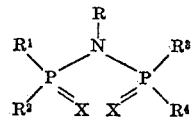

wherein $R^1$, $R^2$, $R^3$ and $R^4$ are each selected from the group consisting of ethoxy, propyloxy, phenoxy, and dimethylamino, wherein R is selected from the group consisting of methyl, ethyl and phenyl, and wherein X is selected from the group consisting of oxygen and sulfur, which comprises reacting a halogen-phosphoric acid derivative having the following general formula:

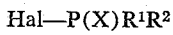

wherein $R^1$, $R^2$ and X have the same definitions as above and wherein Hal is chlorine, with an amidophosphate having the following general formula:

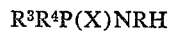

wherein $R^3$, $R^4$, X and R have the same definitions as above, in an inert solvent having dispersed therein a substance selected from the group consisting of sodium, sodium hydride, potassium, potassium hydride, lithium and calcium while stirring at a temperature of 0–150° C.

6. A method of producing imidophosphoric acid derivatives of the following general formula:

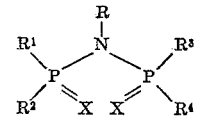

wherein $R^1$, $R^2$, $R^3$ and $R^4$ are each selected from the group consisting of ethoxy, propyloxy, phenoxy, and dimethylamino, wherein R is selected from the group consisting of methyl, ethyl and phenyl, and wherein X is selected from the group consisting of oxygen and sulfur, which comprises reacting a halogen-phosphoric acid derivative having the following general formula:

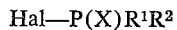

wherein $R^1$, $R^2$ and X have the same definitions as above and wherein Hal is chlorine, with an amidophosphate having the following general formula:

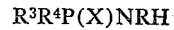

wherein $R^3$, $R^4$, X and R have the same definitions as above in a concentration of 5–50% by weight in an inert solvent having dispersed therein a substance selected from the group consisting of sodium, sodium hydride, potassium, potassium hydride, lithium and calcium.

References Cited in the file of this patent
UNITED STATES PATENTS
2,798,086   Coover et al. _____ July 2, 1957

OTHER REFERENCES

Arbuzov et al.: Bull. Acad. Sci. U.S.S.R. 913–916 (1954).